United States Patent [19]

Au et al.

[11] Patent Number: 5,471,583
[45] Date of Patent: Nov. 28, 1995

[54] FIFO BUFFER HAVING WRITE COUNTER FOR GENERATING EMPTY FLAG VALUE TO BE COMPARED WITH READ POINTER VALUE TO INDICATE THE BUFFER IS FULL

[75] Inventors: Fu L. Au, Milpitas; Einat Yogev, Santa Clara, both of Calif.

[73] Assignee: Integrated Device Technology, Inc., Santa Clara, Calif.

[21] Appl. No.: 415,100

[22] Filed: Mar. 31, 1995

Related U.S. Application Data

[63] Continuation of Ser. No. 210,185, Mar. 17, 1994, abandoned, which is a continuation of Ser. No. 567,213, Aug. 14, 1990, Pat. No. 5,325,487.

[51] Int. Cl.[6] .................................................. G06F 13/14
[52] U.S. Cl. ................. 395/250; 365/189.01; 364/239.6; 364/247.3; 364/939; 364/6; 364/DIG. 1
[58] Field of Search .................................... 395/250, 425; 365/189.01, 189.04, 189.07, 233.5, 236

[56] References Cited

U.S. PATENT DOCUMENTS

| | | | |
|---|---|---|---|
| 4,692,894 | 9/1987 | Bemis | 364/900 |
| 4,694,426 | 9/1987 | Mason | 365/78 |
| 4,839,866 | 6/1989 | Ward et al. | 365/221 |
| 4,864,543 | 9/1989 | Ward et al. | 365/221 |
| 4,888,739 | 12/1989 | Frederick et al. | 365/189.05 |
| 4,888,741 | 12/1989 | Malinowski et al. | 365/230.05 |
| 4,891,788 | 1/1990 | Kreifels | 365/49 |
| 4,935,929 | 6/1990 | Sidman et al. | 371/22.3 |
| 4,942,553 | 7/1990 | Dalrymple et al. | 364/900 |
| 4,954,988 | 9/1990 | Robb | 365/189.02 |
| 4,975,880 | 12/1990 | Kneirim et al. | 365/189.02 |
| 5,027,326 | 6/1991 | Jones | 365/221 |
| 5,027,330 | 6/1991 | Miller | 365/239 |
| 5,079,693 | 1/1992 | Micler | 395/250 |
| 5,088,061 | 2/1992 | Golnabi et al. | 365/189.01 |
| 5,266,817 | 4/1993 | McClure | 365/189.01 |
| 5,267,191 | 11/1993 | Simpson | 365/189.04 |
| 5,274,647 | 12/1993 | Tanaka | 371/48 |

*Primary Examiner*—Thomas C. Lee
*Assistant Examiner*—Moustafa Mohamed Meky
*Attorney, Agent, or Firm*—Skjerven, Morrill, MacPherson, Franklin & Friel; Paul J. Winters

[57] ABSTRACT

To support increased speed of the FIFO, a flag logic circuit is incorporated within the FIFO which asserts the full flag and the empty flag with minimal delay. The flag logic circuit is faster since delays due to comparison logic are eliminated by generating an internal full or empty signal before the FIFO actually becomes full or empty.

4 Claims, 13 Drawing Sheets

FIFO BUFFER HAVING WRITE COUNTER FOR GENERATING EMPTY FLAG VALUE TO BE COMPARED WITH READ POINTER VALUE TO INDICATE THE BUFFER IS FULL

This application is a continuation of application Ser. No. 08/210,185, filed Mar. 17, 1994, now abandoned, which is a continuation of application Ser. No. 07/567,213, filed Aug. 14, 1990, now U.S. Pat. No. 5,325,487.

BACKGROUND OF THE INVENTION

1. Field of the Invention

The invention relates to digital systems and more particularly to FIFOs (First-In First-Out buffers).

2. Description of the Relevant Art

FIFOs are First-In First-Out buffers that act as elastic buffers between two synchronous or asynchronous systems. A FIFO includes an area of storage which temporarily holds data from one digital system that will be subsequently delivered to a second digital system. FIFOs have applications, for example, within networks where data must be transferred from a digital system operating at a first frequency to a digital system operating at a second frequency. In such cases, the FIFO supports efficient utilization of the digital systems since the system transmitting data does not have to wait for the receiving system to accept the data.

FIG. 1 shows an area of storage within a typical FIFO. In this particular example, the area of storage consists of 4K bytes of memory locations, each nine-bits wide.

When receiving data, a technique known as circular buffering is commonly implemented. The basic strategy, as shown in FIG. 2, is to give the appearance that the buffer is organized in a circle, with data "wrapping around" when received. This appearance of circular organization is accomplished by using two pointers, write pointer and read pointer, associated with the buffer. Initially, when no data is contained in the buffer, the write pointer and the read pointer both point to the starting storage location labeled START. Data is received at an input bus and consequently fills the buffer starting from START and incrementing the write pointer. When data is taken from the buffer at an output bus, the read pointer increments. When the last storage location (END) of the buffer has been filled, the write pointer is reset to START and subsequent data will wrap around to the start of the buffer. Similarly, when the read pointer reaches END, it is reset to START and also wraps around.

Control circuitry and flags are used to prevent reading of storage locations which do not contain valid data and to prevent writing into storage locations which contain data not yet read or "consumed." It is evident that these conditions may occur if the READ pointer equals or exceeds the WRITE pointer.

FIG. 3 shows a functional block diagram of a basic FIFO circuit. The basic FIFO comprises a dual port memory 10, write pointer logic 11, read pointer logic 12, three-state buffers 13, a write control 14, a read control 15, flag logic 16, and reset logic 17. Memory 10 includes 4096 (4K) memory locations, each nine bits wide, an address decoder, write circuitry, and a sense amplifier.

During operation, data is sequentially loaded into memory 10 through data input lines $D_0$–$D_8$. Write pointer 11 points to the address of the location in memory 10 to which each byte of input data is loaded.

Data is sequentially output from memory 10 through three-state buffers 13. Read pointer 12 points to the address of the location in memory 10 which contains the byte of data which is read out at the output lines of three-state buffers 13.

Write control 14 controls the address value to which write pointer logic 11 points. Similarly, read control 15 controls the address value to which read pointer logic 12 points. Reset logic 17 allows for the resetting of the write and read pointers.

Flag logic 16 generates flags to prevent reading of storage locations which do not contain valid data and to prevent writing into storage locations which contain data not yet consumed. Flag logic 16 include a pair of associated output lines labeled $\overline{EF}$ and $\overline{FF}$. During operation, an empty flag signal is asserted by flag logic 16 and provided at the EF output line when memory 10 contains no unread data. Similarly, a full flag signal is provided at the $\overline{FF}$ output line when memory 10 is entirely filled with unread data.

When data is read from a particular location in memory 10, time is required to decode the address stored by write pointer logic 11 and to allow the data to propagate through the sense amplifier within memory 10 to three-state buffers 13. Time is also required for flag logic 16 to determine whether memory 10 is completely filled or completely empty and to thereby assert or deassert the full flag or the empty flag, respectively. It is desirable to minimize the time required to read data from a FIFO. It is further desirable to minimize the time required to generate the full flag and the empty flag.

SUMMARY OF THE INVENTION

In accordance with the invention, a FIFO buffer includes a shadow register connected at the sense amplifier output of a memory storage area. The shadow register allows data to be read from the FIFO at an increased speed since the memory delay path is eliminated by preloading data into the shadow register.

To support increased speed of the FIFO, a flag logic circuit is incorporated within the FIFO which asserts the full flag and the empty flag with minimal delay. The flag logic circuit is faster since delays due to comparison logic are eliminated.

According to the invention, a FIFO buffer is provided for sequentially transmitting data from one digital system to a second digital system. The FIFO comprises a dual port memory area having a plurality of storage locations, write pointer logic for controlling the storage location to which incoming data is written, and read pointer logic for controlling the storage location from which outgoing data is read. The FIFO further comprises a shadow register coupled to the memory and an output buffer coupled to the shadow register. Data previously stored by a first storage location of the memory is provided from the shadow register to the output buffer during a time interval when data is provided from a second storage location of the memory to the shadow register.

According to another aspect of the invention, the FIFO buffer includes a dual port memory area, write pointer logic, and read pointer logic. The FIFO buffer further comprises flag logic coupled to the write pointer logic and to the read pointer logic. The flag logic includes a comparator circuit which provides a comparator signal for generating an empty flag signal and a comparator signal for generating a full flag signal. The comparator signal for generating the empty flag is provided from the comparator circuit before the FIFO buffer becomes empty and the comparator signal for generating the full flag is provided from the comparator circuit before the FIFO buffer becomes full. The invention will be more readily understood by reference to the drawings and the detailed description. As will be appreciated by one skilled in the art, the invention is applicable to FIFO circuitry in general, and is not limited to the specific embodiment disclosed.

DETAILED DESCRIPTION

Figure 1:
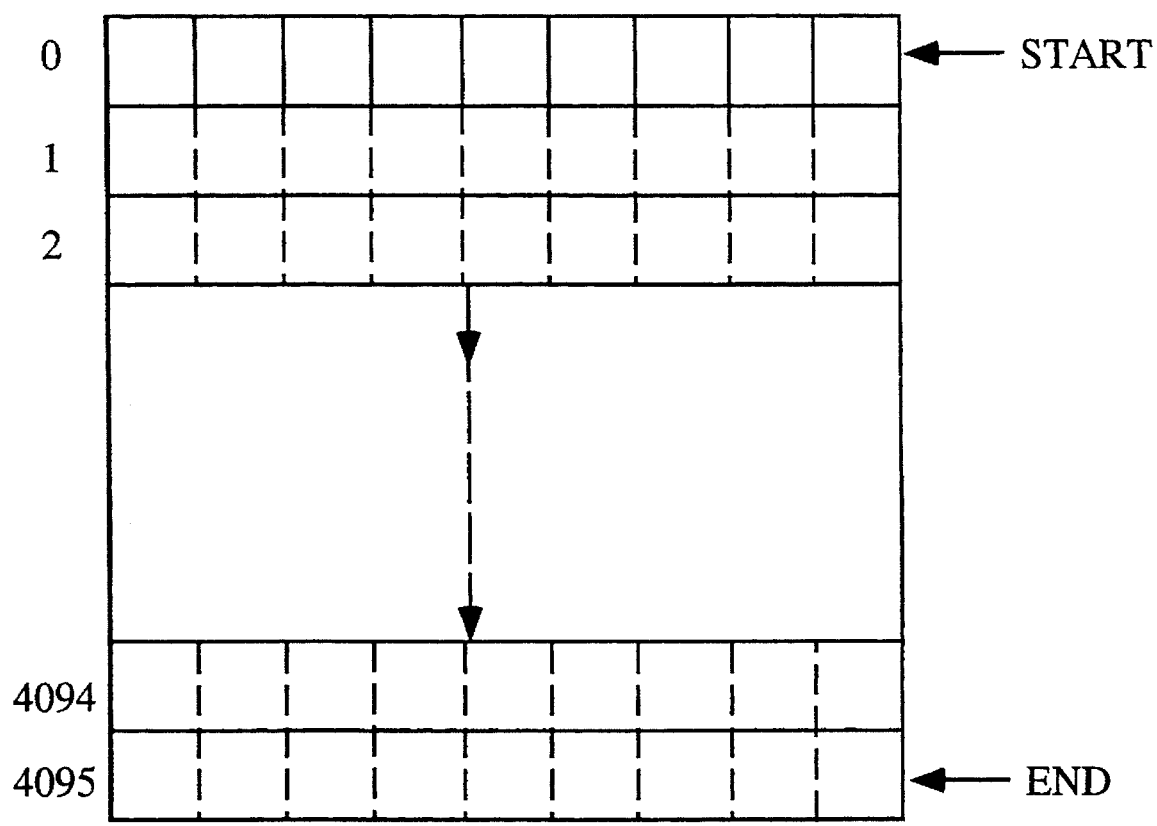
FIG. 1 (Prior Art) shows an area of storage within a typical FIFO circuit.
Figure 2:
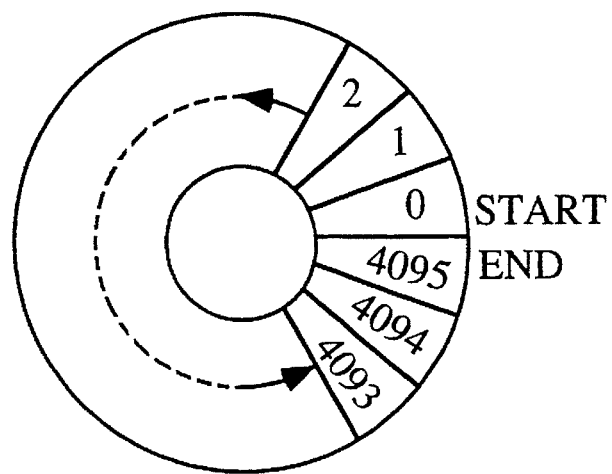
FIG. 2 (Prior Art) illustrates a circular buffering technique commonly implemented within FIFO circuits.
Figure 3:
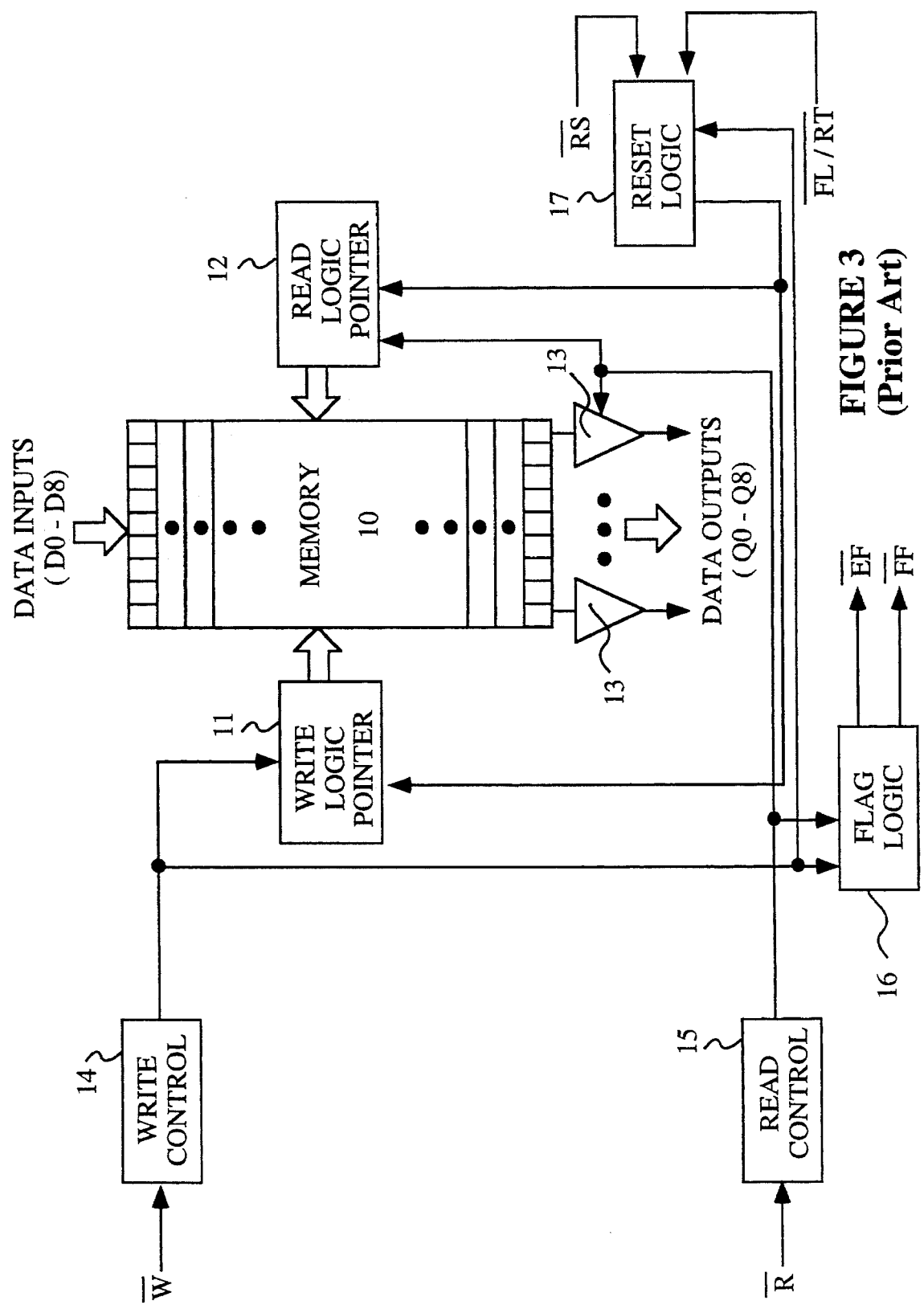
FIG. 3 (Prior Art) shows a functional block diagram of a basic FIFO circuit.
Figure 4:
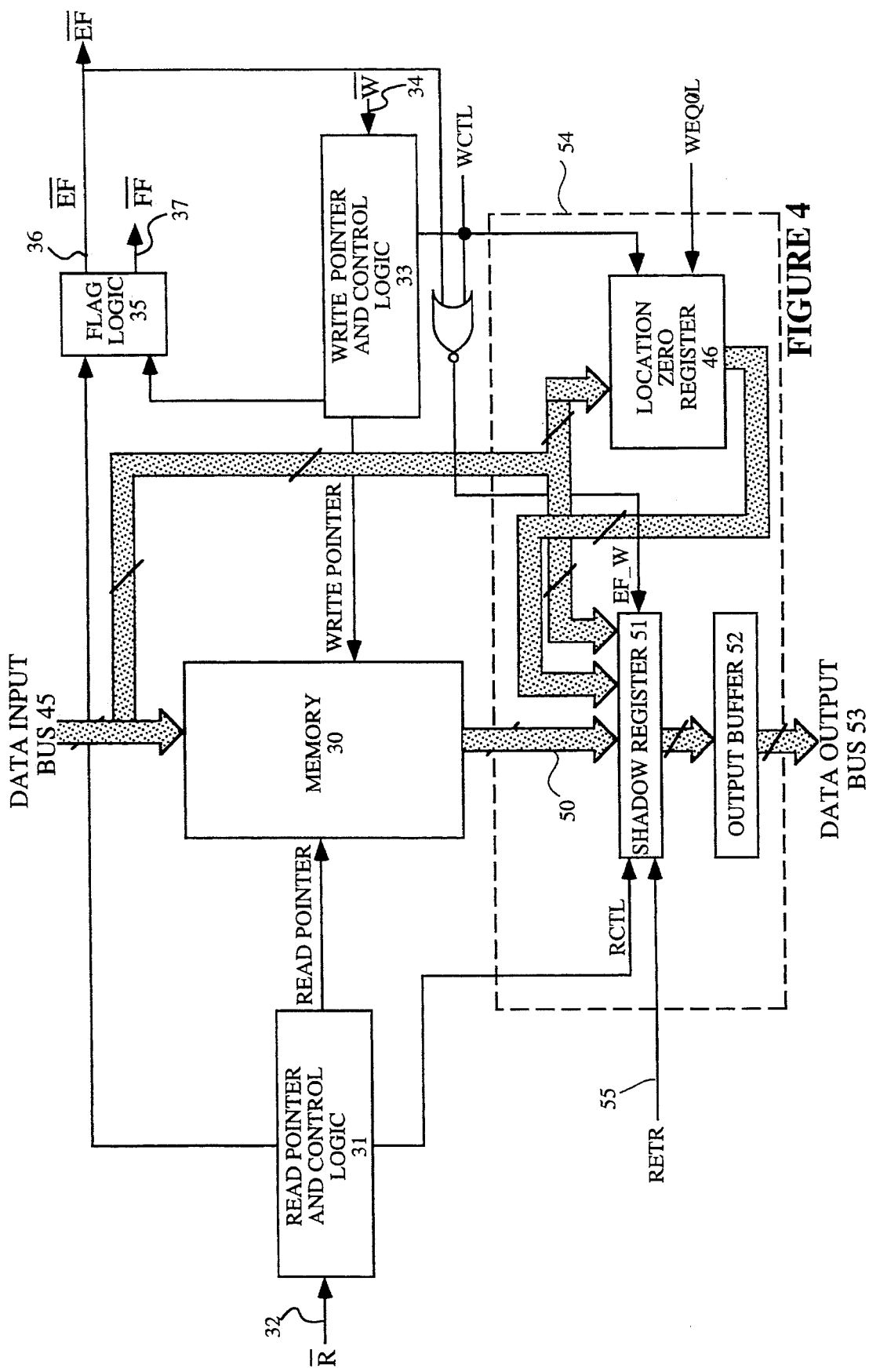
FIG. 4 shows a functional block diagram of a FIFO buffer with a shadow register in accordance with the invention.

Referring to FIG. 4, a FIFO circuit according to the present invention is shown with a two-port memory 30 having 4 kilobytes of storage (where each byte, including parity, is nine bits wide). Read pointer and control logic 31 is connected to memory 30 and includes an input line 32 for receiving a read pulse $\overline{R}$. Write pointer and control logic 33 is also connected to memory 30 and includes an input line 4 for receiving a write pulse $\overline{W}$.

Flag logic 35 is connected to read pointer and control logic 31 and to write pointer and control logic 33. Flag logic 35 monitors the write and read pointers and, when appropriate, asserts the empty flag signal or the full flag signal at an output line 36 or 37, respectively.

Input data is provided to the FIFO circuit through data input bus 45. Data input bus 45 in this embodiment is nine bits wide. Memory 30 is connected to data input bus 45. A location zero register 46 is further connected to data input bus 45.

Data is provided from memory 30 through a sense amplifier (internal to memory 30) to a bus 50. Bus 50 is connected to a shadow register 51 which is further connected to an output buffer 52. Data is provided from the FIFO circuit at a data output bus 53 connected to output buffer 52. Location zero register 46, shadow register 51, and output buffer 52 are shown collectively within a block 54.

Location zero register 46 stores input data received from data input bus 45 only when the write pointer (provided as an output signal from write pointer and control logic 38) pointing to location zero (when its value equals zero). The data stored in location zero register 46 is copied into shadow register 51 when a retransmit signal is asserted on a RETR input line 55. Location zero register 46 is provided to support a retransmit function and to thereby provide high speed retransmission of data.

If data is written into the FIFO circuit when the empty flag is asserted (when memory 30 is empty), the data is written into memory 30 as well as into shadow register 51 when the write signal $\overline{W}$ is pulsed low.

If data is written into the FIFO circuit when the empty flag is not asserted (when memory 30 is not empty), the received data is initially stored only within memory 30. Shadow register 51 acts as a pipeline register in that when data previously loaded in a particular location of memory 30 is read from output buffer 52, the data stored in the successive location of memory 30 is simultaneously loaded into shadow register 51.

Shadow register 51 within the FIFO circuit allows preloading of data read from memory 30 and consequently eliminates significant decoding and other delays associated with memory 30. Since the preloading process is transparent to a user, the name "shadow pipeline register" attaches.

Figure 5:
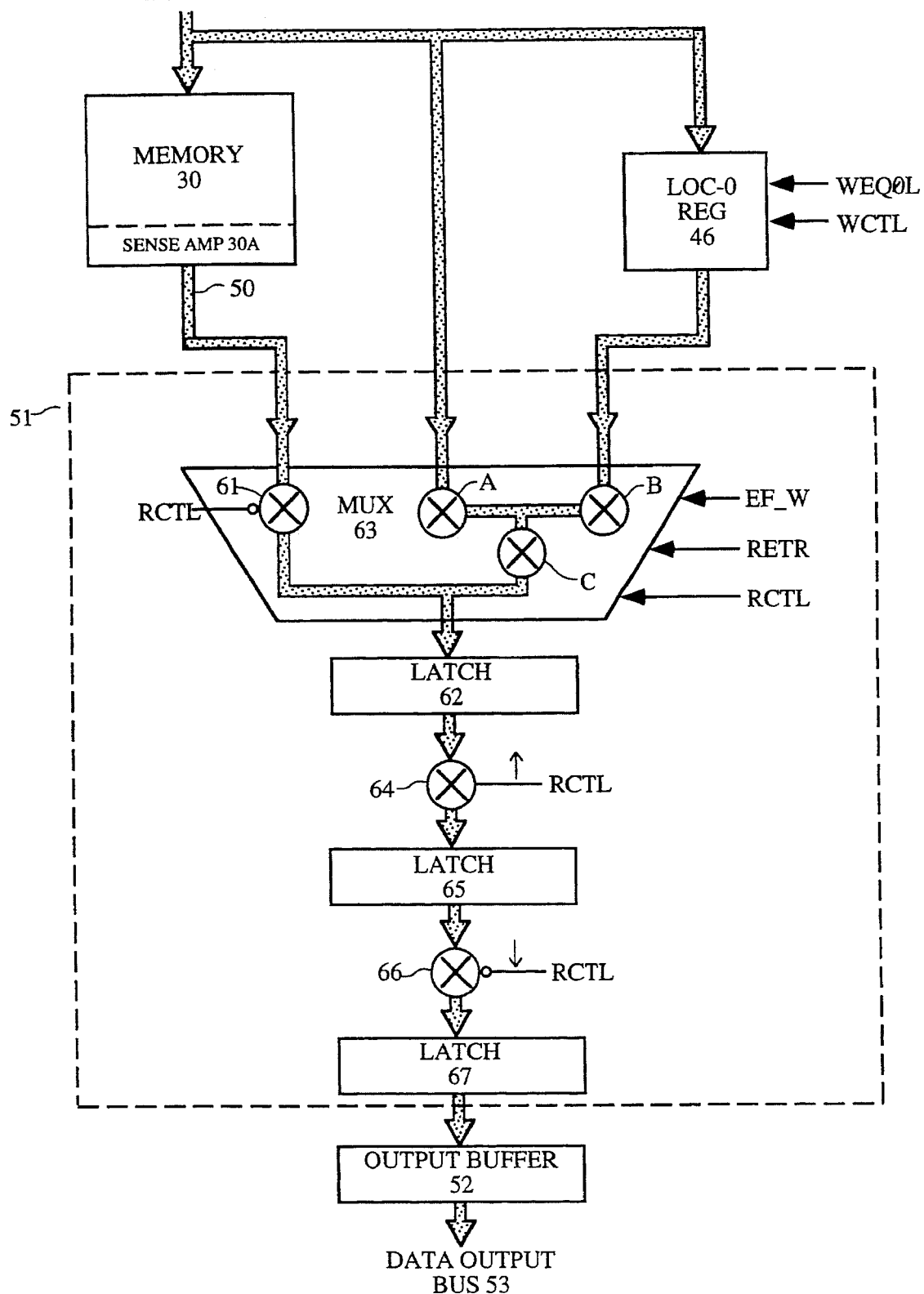
FIG. 5 shows a functional block diagram of a portion of a FIFO circuit according to the invention including interior sections of a shadow register.

The flow of data within the FIFO circuit is explained with reference to FIG. 5 which shows a section of the FIFO circuit with an interior portion of shadow register 51. Shadow register 51 includes a transfer gate 61 connected to a sense amplifier 30A of memory 30. Transfer gate 61 is shown within a multiplexer 63. A nine-bit latch 62 is connected to an output bus of multiplexer 63. A transfer gate 64 is connected to latch 62 and to a second nine-bit latch 65. A transfer gate 66 is connected to latch 65 and to a third nine-bit latch 67. Finally, output buffer 52 is connected to latch 67.

During initial operation when the FIFO is empty and reset, both the write pointer and the read pointer point to location zero of memory 30. When the write pulse is low, a byte of data on data input bus 45 is stored in address zero of memory 30. The byte of data is simultaneously stored in the location zero register 46, in latch 62, and in latch 65. If consecutive write cycles occur, data is stored in the successive locations of memory 30. When the RCTL signal goes low, the first byte of data stored in latch 65 is loaded into latch 67 and is thus available for reading at output buffer 52 through data output bus 53. At the same time, if memory 30 is not empty, the second location of memory 30 is decoded and the contents are loaded into latch 62 through multiplexer 63. When the RCTL signal goes high, the contents of latch 62 are loaded into latch 65 through transfer gate 64.

When the FIFO has a plurality of storage locations containing unread data, the operation is similar. For example, at the same time when a byte of data previously stored in the tenth location of memory 30 is loaded into latch 67 (when the RCTL signal is low), the eleventh location of memory 30 is decoded and the contents of that location are loaded into latch 62. During this time, the contents of latch 67 can be read through output buffer 52. When the RCTL signal goes high, the contents of latch 62 (eleventh data byte) are loaded into latch 65 (which had previously stored the tenth data byte).

When a retransmit pulse occurs, the content of location zero register 46 is loaded into latch 62 and into latch 65 through multiplexer 63. When the RCTL signal goes low, the content of latch 65 is loaded into latch 67 and is available to be read at output buffer 52. At the same time, the second location of memory 30 (location one) is decoded and the content loaded into latch 62.

It should be noted that the decoding of memory 30 and the preloading process is transparent to a user. Since memory 30 is decoded before the data is required, decoding delays are eliminated.

Figure 6:
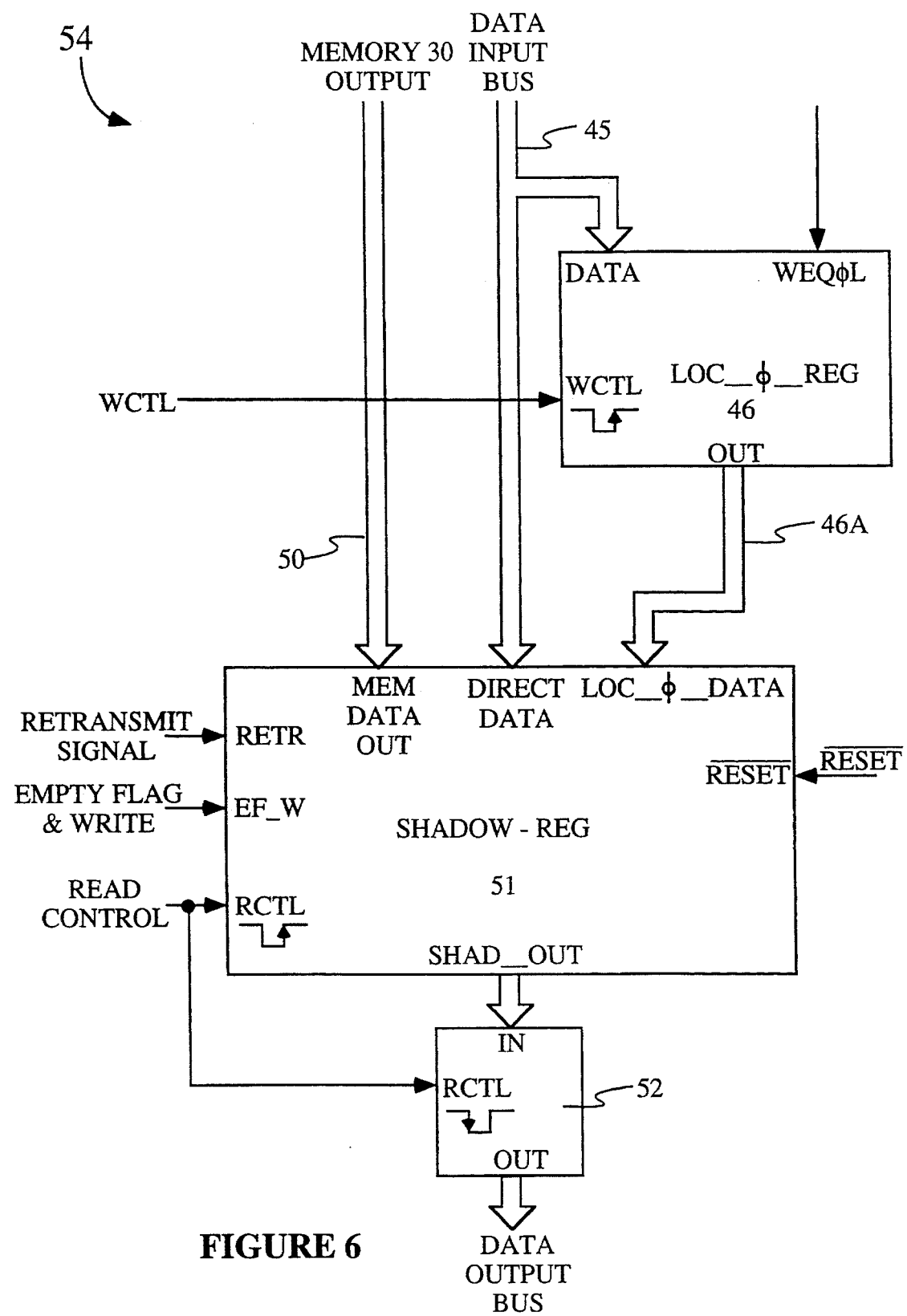
FIG. 6 shows a functional block diagram of an output section incorporated within a FIFO circuit in accordance with the invention.

Block 54 (of FIG. 4) comprising location zero register 46, shadow register 51, and output buffer 52 is shown in greater detail in FIG. 6. Data is provided to shadow register 51 at one of three ports labeled MEM DATA OUT, DIRECT DATA, and LOC_0_DATA. The MEM DATA OUT port is connected to memory 30 through bus 50. The DIRECT DATA port is connected to data input bus 45. Finally, the LOC_0_DATA port is connected to location zero register 46 through a bus 46A. Location zero register 46 includes input lines labeled WEQ0L and WCTL.

As stated above, incorporation of shadow register 51 within the FIFO circuit in accordance with the invention allows data to be read much faster compared to the speed at which previous FIFO circuits could be read. To support the faster read operations, as well as to allow faster write operations, the FIFO circuit in accordance with another aspect of the invention includes circuitry for generating the empty flag signal and the full flag signal expeditiously. According to the invention, the circuitry which generates the empty flag and the full flag reduces processing time by eliminating delays due in part to comparator circuitry.

Figure 7:
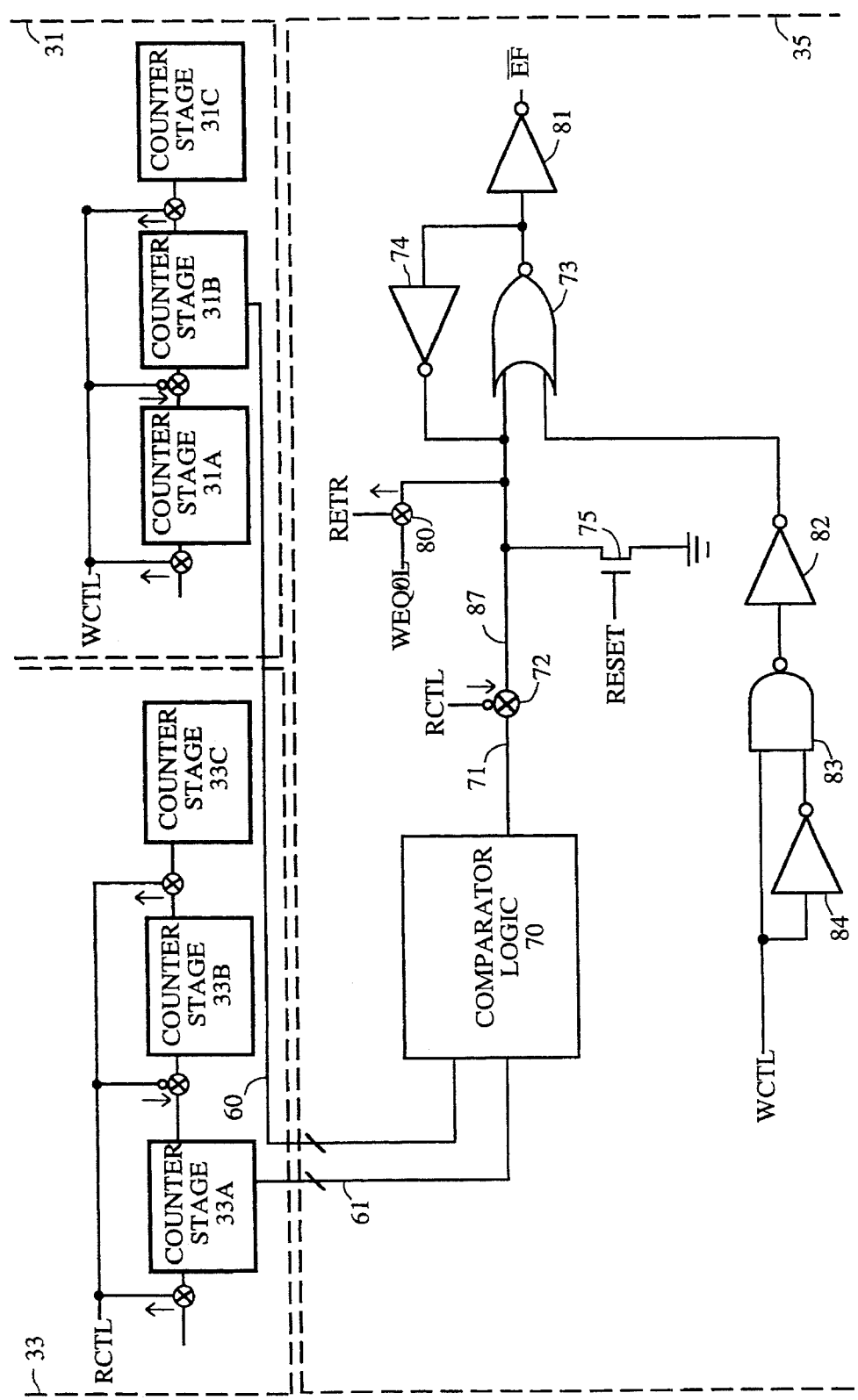
FIG. 7 shows a functional block diagram of flag logic within a FIFO circuit for generating the empty flag.

FIG. 7 shows a functional diagram of portions of write pointer and control logic 31, read pointer and control logic 33, and flag logic 35. Write pointer and control logic 31 includes three stages of counters labeled 31A, 31B and 31C. Similarly, read pointer and control logic 33 includes three stages of counters labeled 33A, 33B and 33C. Each of the counter stages 31A–31C and 33A–33C is a 12-bit counter. Counter stages 31A and 31C increment on the rising edge of the WCTL signal while counter stage 31B increments on the falling edge of the WCTL signal. Similarly, counter stages 33A and 33C increment on the rising edge of the RCTL signal while counter stage 33B increments on the falling edge of the RCTL signal. Counter stage 31B is connected to comparator logic 70 through a bus 60. Counter stage 33A is connected to comparator logic 70 through a bus 61. Comparator logic 70 provides a low output at line 71 only when the signals on busses 60 and 61 are equal.

A transfer gate 72 is connected to line 71. Transfer gate 72 is further connected to a NOR gate 73, an inverter 74, and an N-channel MOSFET 75. A transfer gate 80 is connected to line 87 and an inverter 81 is connected to NOR gate 73 and inverter 74. NOR gate 73 is further connected to an inverter 82. Finally, a NAND gate 83 is connected to inverter 82, and an inverter 84 is connected to AND gate 83.

During operation, the value of counter stage 31A is always one greater than the value of counter stage 31C. Counter stages 31A and 31C each increment when the WCTL signal goes high. When the WCTL signal goes low, the value of counter stage 31B increments to equal the value of counter stage 31A.

Similarly, during operation, the value of counter stage 33A is always one greater than the value of counter stage 33C. Counter stages 33A and 33C each increment when the RCTL signal goes high. When the RCTL signal goes low, the value of counter stage 33B increments to equal the value of counter stage 33A.

Counter stage 31C and counter stage 33A are each connected to an address decoder of memory 30 (connection not shown in FIG. 7). The value of counter stage 31C determines the address of memory 30 into which data is written when the write pulse $\overline{W}$ goes low. Similarly, the value of counter stage 33A determines the address of memory 30 from which data is read when the read pulse $\overline{R}$ goes low. Hence counter stages 31C and 33A act as write and read pointers, respectively.

As explained above, the FIFO circuit may be empty if the value of the write pointer equals the value of the read pointer. In accordance with the invention, delays in generating the empty flag are minimized by comparing the value of counter stage 31B to the value of counter stage 33A. If the values of counter stage 31B and counter stage 33A are equal, comparator logic 70 generates a low output signal at line 71. If a read operation occurs, the low comparator output signal is transferred to a line 87 connected to NOR gate 73. This transfer occurs when the RCTL signal goes low since transfer gate 72 is activated. It should be noted that counter stage 33A does not change when the RCTL signal goes low.

When the low comparator signal propagates through transfer gate 72, line 87 remains low unless certain conditions, as explained below, occur. When line 87 goes low, the output of inverter 81 goes low provided that the other input of NOR gate 73 is low (from the output of inverter 82). Since the output of inverter 82 is normally low, the empty flag is asserted (goes low).

It is evident that since counter stage 31B is compared to counter stage 33A before the FIFO is actually empty (when counter stage 31B equals counter stage 33B), the inherent delay of comparator 70 does not increase the time required to generate the empty flag after the falling edge of the RCTL signal occurs.

There are other situations during operation of the FIFO circuit when the empty flag should be deasserted, or when the generation of the empty flag should occur regardless of the read and write pointer values. One such situation occurs when the FIFO circuit is reset. When the FIFO circuit is reset, memory 30 is presumed to be empty. Therefore, it is desirable to assert the empty flag. MOSFET 75 is connected to cause assertion of the empty flag upon resetting of the FIFO circuit. When reset occurs, MOSFET 75 turns on which thus pulls the signal on line 87 low. Inverter 74 has a weak output signal and consequently line 87 goes low. The output of inverter 81 therefore goes low, thus asserting the empty flag.

Deassertion of the empty flag is desired if a write occurs. NAND gate 83 and inverters 82 and 84 are connected to produce a positive pulse immediately after a rising edge of the WCTL signal occurs. The duration of the positive pulse equals the time delay introduced by inverter 84. The positive pulse is received at NOR gate 73 and correspondingly causes the output of NOR gate 73 to go low. The signal on line 87 accordingly goes high and the empty flag is deasserted.

Furthermore, when a retransmit operation occurs, the RETR signal goes high and thus the WEQOL signal propagates through transfer gate 80. The WEQOL signal is low only when counter stage 31B is equal to counter stage 33B and when no wrap-around has occurred. When the WEQOL signal is low, the FIFO is empty and thus the low signal at line 87 drives the empty flag signal EF low. When the WEQOL signal is high, line 87 is high and thus the empty flag signal $\overline{EF}$ is deasserted high.

During operation, when the FIFO buffer is reset, counter stage 33A is set to a value of 1 while counter stages 33B and 33C are each set to a value of 0. Similarly, counter stage 31A is set to a value of 1 while counter stages 31B and 31C are each set to a value of 0. The RCTL and WCTL signals are initially high. When a write operation occurs for writing data into the FIFO buffer, the WCTL signal goes low and accordingly counter stage 31B is incremented to a value of 1. Since counter stage 31C is connected to the FIFO memory to serve as a write pointer and since its value is 0, the data is written into the first location (location 0) of the FIFO memory 30. In accordance with the above description, the data is also written into location zero register 46 and into latch 65. When the WCTL signal returns high, counter stage 31A is incremented to a value of 2 while counter stage 31C is incremented to a value of 1.

It should be noted that initially, upon reset, the empty flag signal is asserted low due to MOSFET 75. When the WCTL signal goes low, the empty flag is deasserted due to inverters 82 and 94 and NAND gate 83.

It should also be noted that after the empty flag is deasserted and when a single location in memory 30 remains unread, comparator logic 70 provides a low signal at line 71 since counter stage 33A equals counter stage 31B (both have value of 1 for this example). When a successive read operation occurs, the RCTL signal goes low and accordingly the low comparator signal at line 71 propagates to line 87 through transfer gate 72. In response, the empty flag signal $\overline{EF}$ is asserted low. At the same time, counter stage 33B increments to a value of 1 and the data is loaded into latch 67 from latch 65 and is available to be read at data output bus 53 from output buffer 52. The empty flag signal remains low until a succeeding write operation occurs. As a result of the configuration of the present invention, comparator logic 70 provides a low comparator signal for generating the empty flag before the FIFO buffer is empty. Thus, the propagation delay due to comparison logic within conventional FIFO buffers is eliminated since the comparator signal is generated before the FIFO becomes empty rather than after the FIFO becomes empty.

Figure 8:
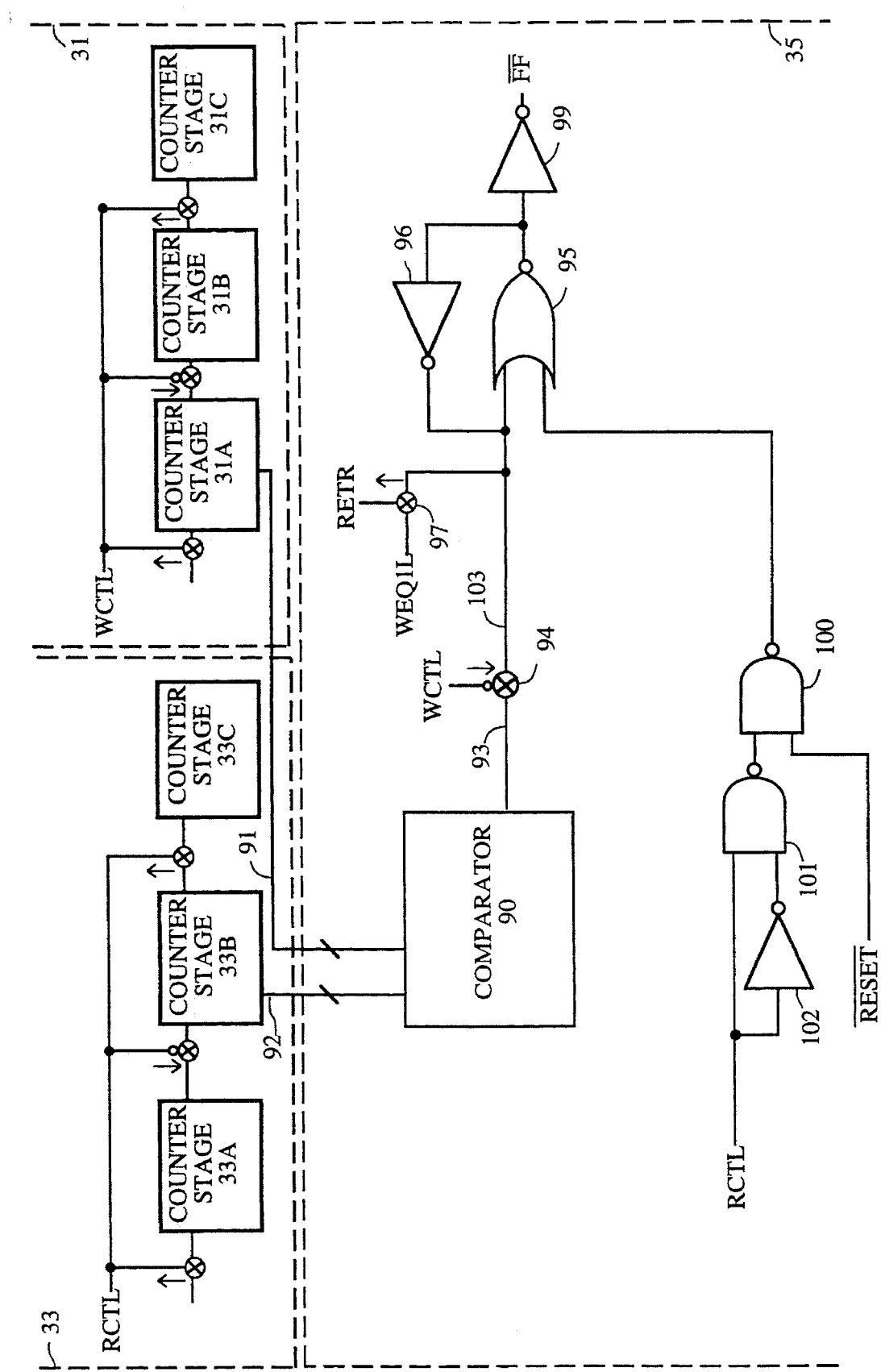
FIG. 8 shows a functional block diagram of flag logic within a FIFO circuit for generating the full flag.

Generation of the full flag signal is similar. FIG. 8 shows a functional diagram of portions of write pointer and control logic 31, read pointer and control logic 33, and flag logic 35. Counter stage 31A connects to comparator logic 90 through a bus 91. Counter stage 33B connects to comparator logic 90 through a bus 92. Comparator logic 90 provides a low output at line 93 only when the signals on busses 91 and 92 are equal.

A transfer gate 94 is connected to line 93. Transfer gate 94 is further connected to a NOR gate 95, an inverter 96, and a transfer gate 97. An inverter 99 is connected to NOR gate 95 and inverter 96. NOR gate 95 is further connected to NAND gate 100. Finally, an AND gate 101 is connected to OR gate 100, and an inverter 102 is connected to AND gate 101.

During operation, as explained above, the value of counter stage 31A is always one greater than the value of counter stage 31C. Counter stages 31A and 31C each increment when the WCTL signal goes high. When the WCTL signal goes low, the value of counter stage 31B increments to equal the value of counter stage 31A.

Similarly, during operation, the value of counter stage 33A is always one greater than the value of counter stage 33C. Counter stages 33A and 33C each increment when the RCTL signal goes high. When the RCTL signal goes low, the value of counter stage 33B increments to equal the value of counter stage 33A.

Also explained above, counter stage 31C and counter stage 33A are each connected to an address decoder of memory 30 (connection not shown in FIG. 8). The value of counter stage 31C determines the address of memory 30 into which data is written when the WCTL signal goes low. Similarly, the value of counter stage 33A determines the address of memory 30 from which data is read when the RCTL signal goes low. Hence counter stages 31C and 33A act as write and read pointers, respectively.

In accordance with the invention, delays in generating the full flag are minimized by comparing the value of counter stage 31A to the value of counter stage 33B. If the values of counter stage 31A and counter stage 33B are equal, comparator logic 90 generates a low output signal at line 93. If a write operation occurs, the low comparator output signal is transferred to a line 103 connected to NOR gate 95. This transfer occurs when the WCTL signal goes low since transfer gate 94 is activated. It should be noted that counter stage 31A does not change when the WCTL signal goes low.

When the low signal is propagated through transfer gate 94, line 103 remains low unless certain conditions, as explained below, occur. When line 103 goes low, the output of inverter 99 goes low provided that the other input of NOR gate 95 is low (from the output of NAND gate 100). Since the output of NAND gate 100 is normally low, the empty flag is asserted (goes low).

It is evident that since counter stage 31A is compared to counter stage 33B before the FIFO is actually full (when counter stage 31B equals counter stage 33B), the inherent delay of comparator 90 does not increase the time required to generate the full flag after the falling edge of the WCTL signal occurs.

There are other situations during operation of the FIFO circuit when the full flag should be deasserted regardless of the read and write pointer values. One such situation occurs when the FIFO circuit is reset. As stated above, when the FIFO circuit is reset, memory 30 is presumed to be empty. Therefore, it is desirable to deassert the full flag. NAND gate 100 causes deassertion of the full flag upon resetting of the FIFO circuit. When reset occurs, the output of NAND gate 100 goes high. The output of NOR gate 95 consequently goes low and, as a result, the output of inverter 99 goes high, thus deasserting the full flag.

Deassertion of the full flag is also desired if a read occurs. AND gate 101 and inverter 102 are connected to produce a positive pulse immediately after a rising edge of the RCTL signal occurs. The duration of the positive pulse equals the time delay introduced by inverter 102. The positive pulse is received at NOR gate 95 and correspondingly causes the output of NOR gate 95 to go low. The output of inverter 99 therefore goes high, and thus the full flag is deasserted.

When a retransmit operation occurs, the RETR signal goes high and thus the WEQ1L signal propagates through transfer gate 97. The WEQ1L signal is low only when counter stage 31B is equal to counter stage 33B and when wrap-around has occurred. When the WEQ1L signal is low, the FIFO is full and thus the low signal at line 103 drives the full flag signal $\overline{FF}$ low. When the WEQ1L signal is high, line 103 is high and thus the full flag signal $\overline{FF}$ is deasserted high.

Figure 9:
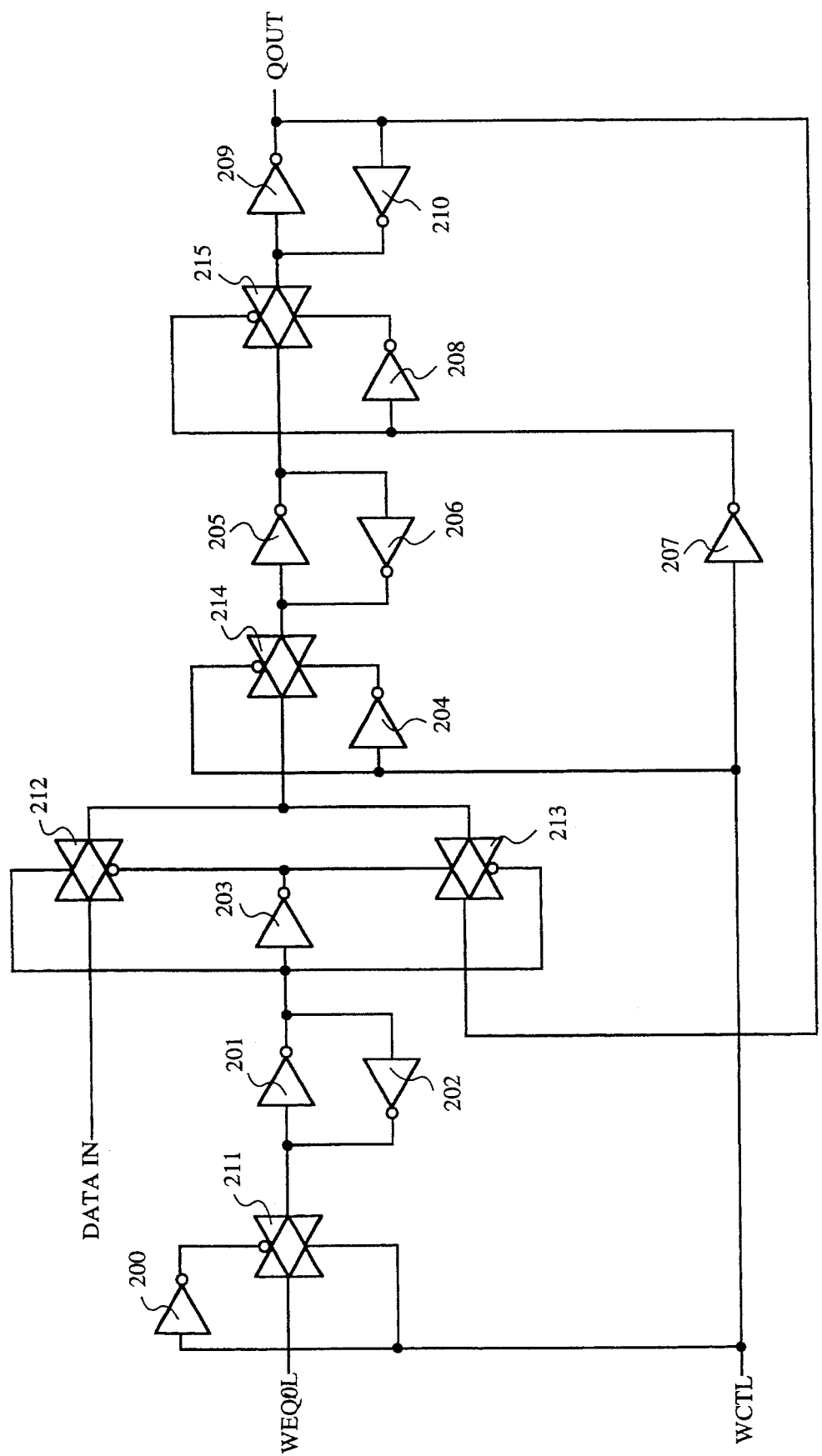
FIG. 9 shows a schematic of a location zero register incorporated within a FIFO circuit in accordance with the invention.

FIG. 9 shows a schematic of a portion of a location zero register 46 incorporated within a FIFO circuit in accordance with the invention. The circuit includes inverters 200–210 and transfer gates 211–215. The figure shows circuitry to store a single bit of the location zero data. Since the FIFO is a nine-bit system, a total of nine circuits as shown in FIG. 9 are configured within the FIFO.

Figure 10:
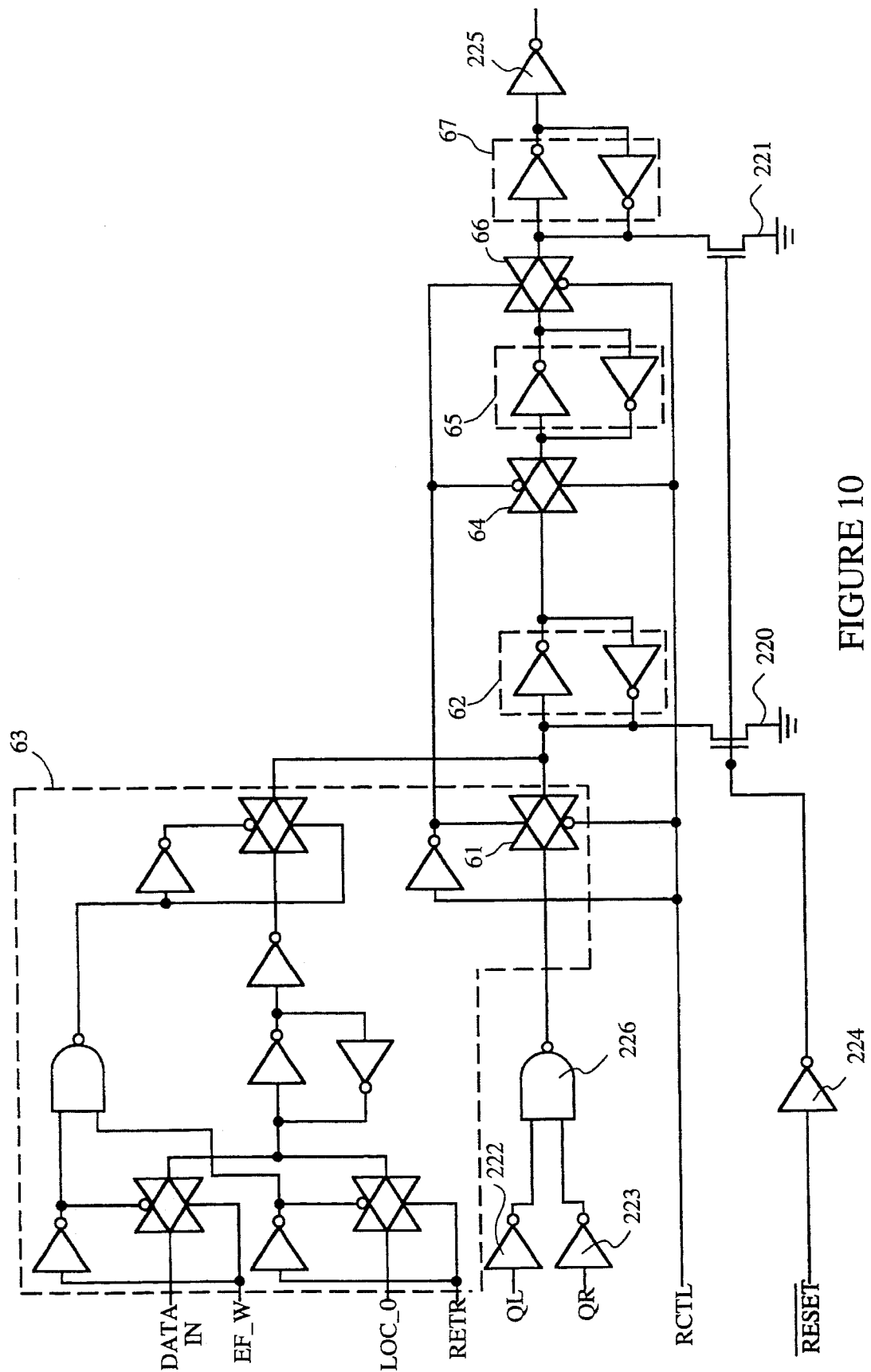
FIG. 10 shows a schematic of a shadow register and latch incorporated within a FIFO circuit in accordance with the invention.

FIG. 10 shows a schematic of a shadow register 51 portion incorporated within a FIFO circuit in accordance with the invention. Similar to FIG. 9, the figure shows the circuitry for a single bit within the FIFO. Latches 62, 65, and 67, as well as transfer gates 61, 64, and 66, and multiplexer 63 are shown in dashed blocks. The circuit also includes MOSFETs 220 and 221, inverters 222–225, and NAND gate 226.

Figure 11:
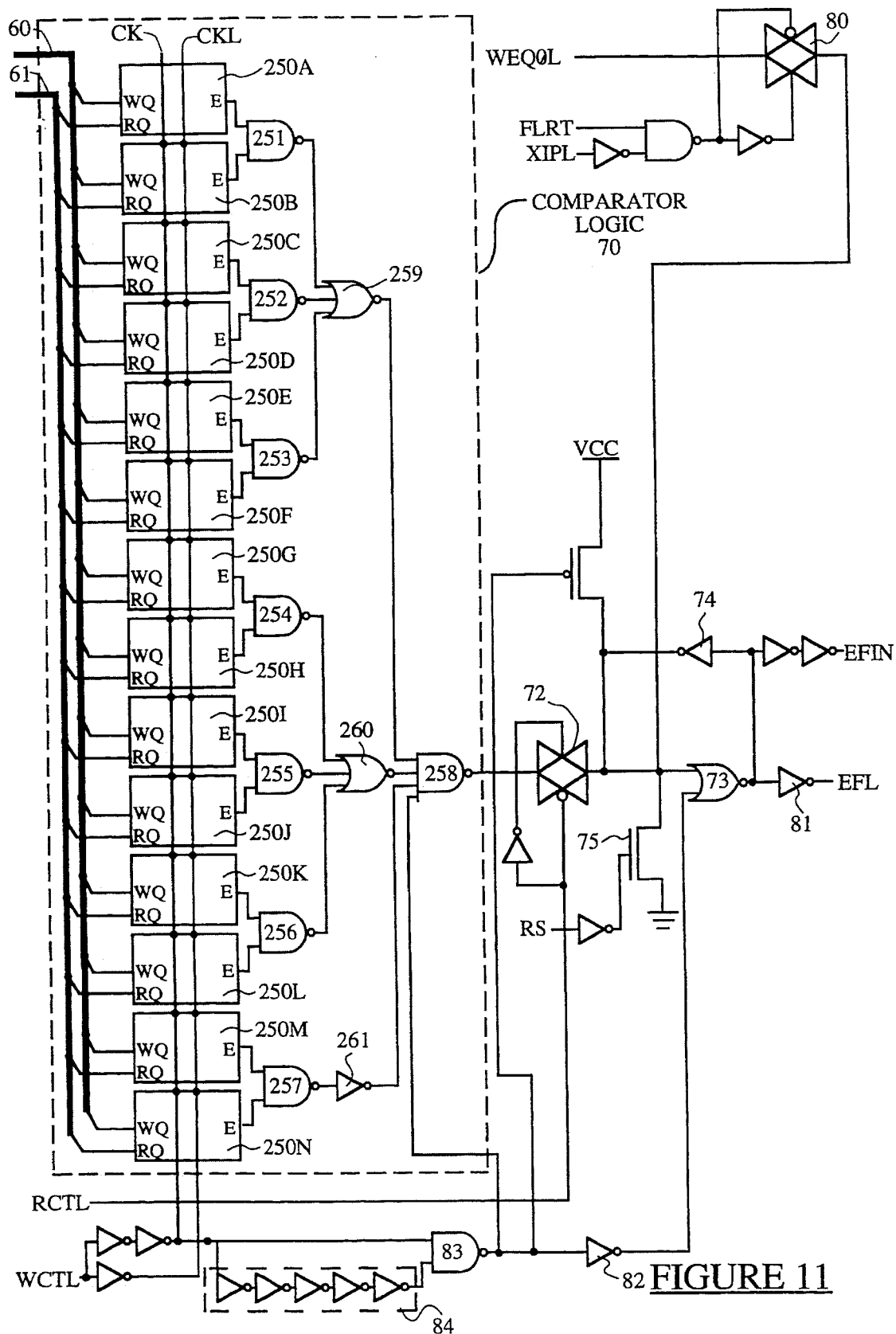
FIGS. 11 and 12 show schematics of interior portions of comparator logic within a FIFO circuit.

Referring next to FIG. 11, a schematic of an interior portion of comparator logic 70 is shown connected to the empty flag generating circuitry. Comparator logic 70 includes comparator units 250A–250N. The circuit further includes NAND gates 251–258, NOR gates 259 and 260, and inverter 261. Each comparator unit 250A–250N is connected to a separate line of each of the busses 60 and 61.

Figure 12:
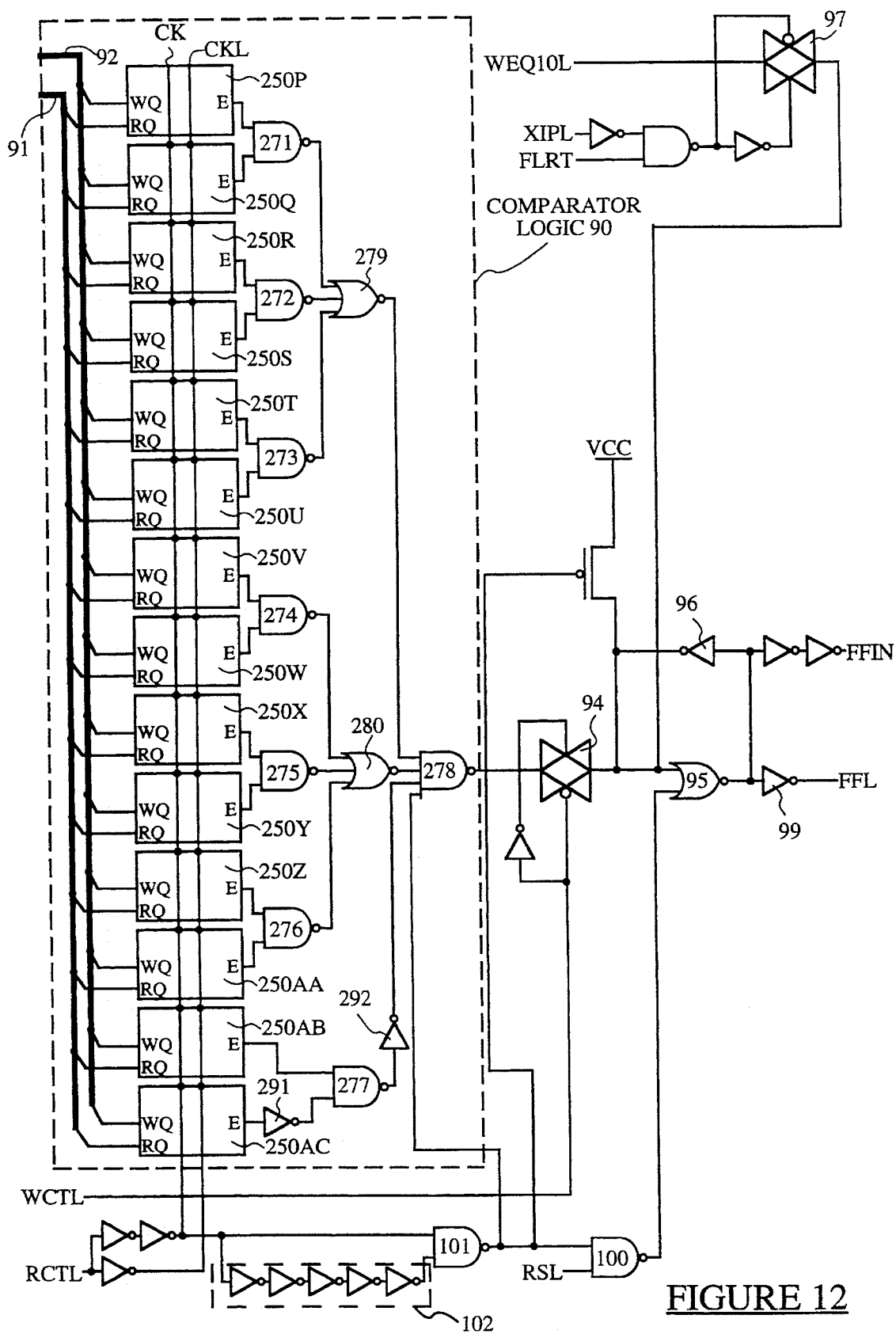

FIG. 12 shows a schematic of an interior portion of comparator logic 90 connected to the full flag generating circuitry. Comparator logic 90 includes comparator units 250P–250AC. The circuit further includes NAND gates 271–278, NOR gates 279 and 290, and inverters 291 and 292. Each comparator unit 250P–250AC is connected to a separate line of each of the busses 91 and 92.

Comparator logic 90 is similar to comparator logic 70 with the exception of inverter gate 291. Inverter gate 291 is used to detect a carry bit which indicates whether or not the FIFO has wrapped around. If the write pointer equals the read pointer due to memory wraparound, the full flag signal is asserted.

Figure 13:
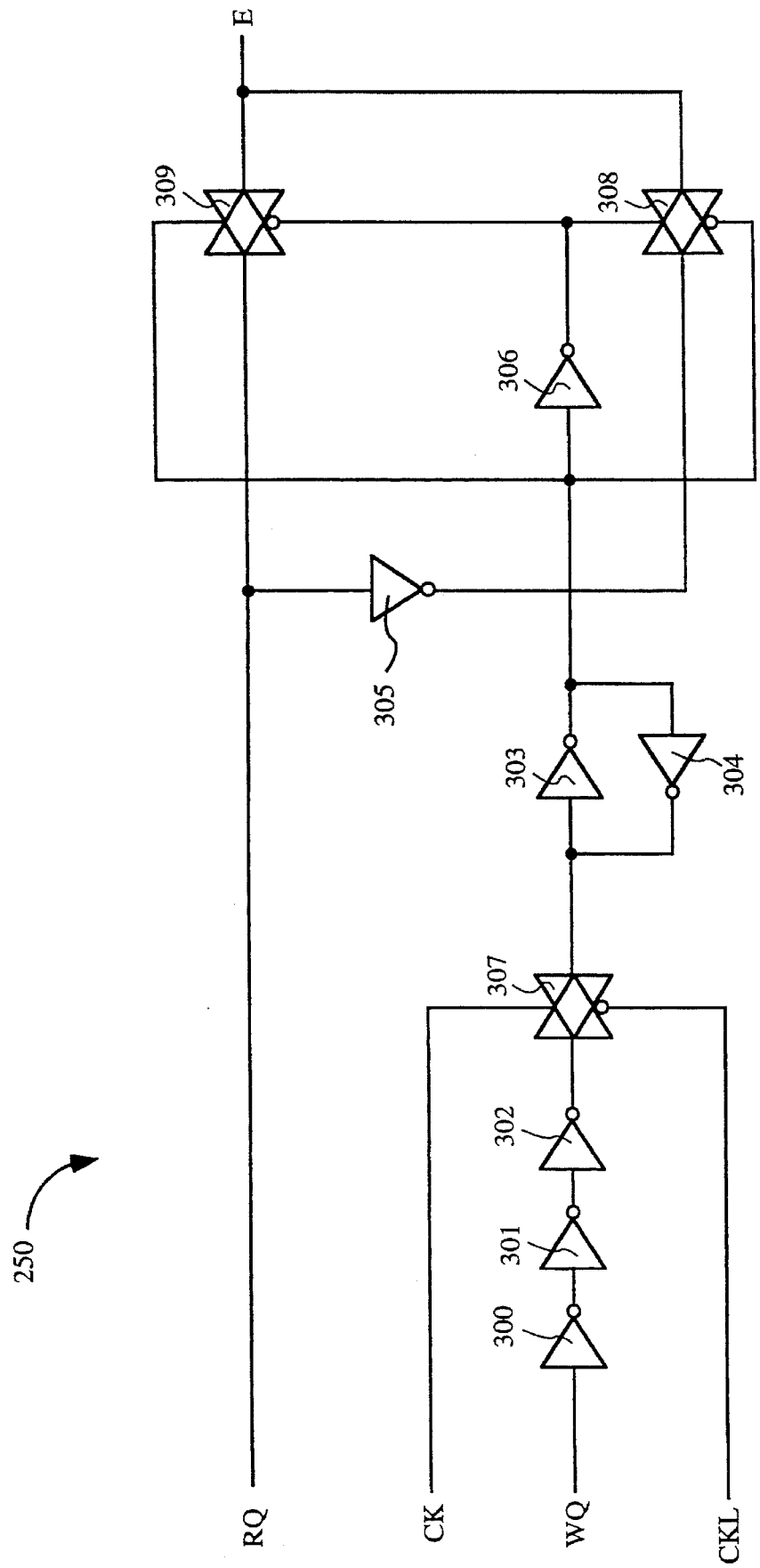
FIG. 13 shows a schematic of a comparator unit.

FIG. 13 shows a schematic of a comparator unit 250. The comparator unit includes inverters 300–306, and transfer gate 309. Comparator unit 250 of FIG. 13 is representative of each of the comparator units 250A–250AC of FIGS. 11 and 12.

Figure 14:
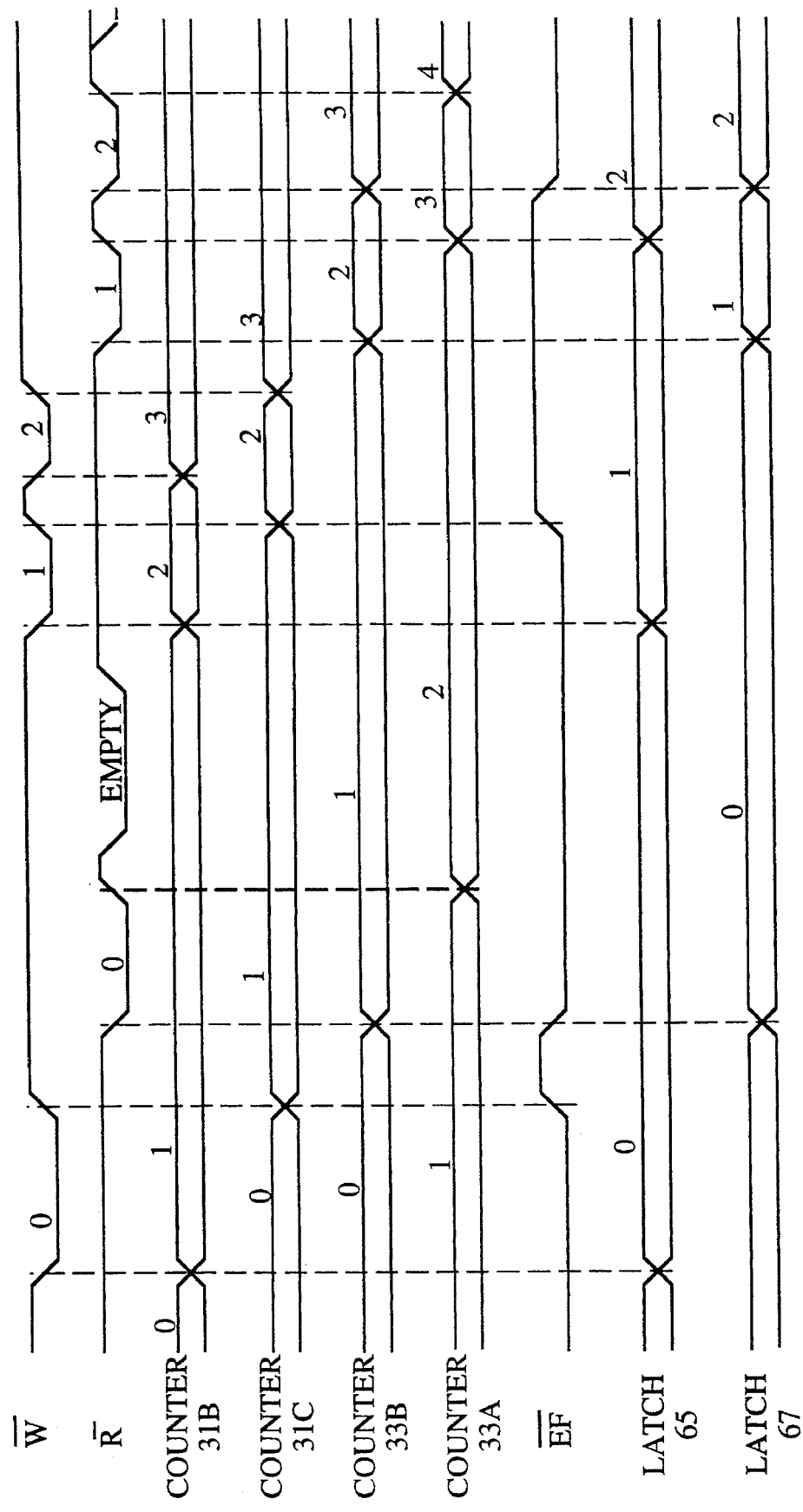
FIG. 14 shows a timing diagram for a FIFO circuit in accordance with the invention.

FIG. 14 shows a timing diagram for a FIFO circuit in accordance with the invention. The timing diagram shows the generation of the empty flag before a first write pulse $\overline{W}$ and after a read pulse R. The transitions in the values of counter stages 31B, 31C, 33A, and 33B are also shown. The content of latch 65 is transferred to a latch 67 on the falling edge of the read pulse $\overline{R}$.

The embodiments described above are intended to be exemplary and not limiting. In view of the above disclosure, modifications will be obvious to one of ordinary skill in the art without departing from the scope of the invention.

We claim:

1. A FIFO buffer for sequentially transmitting data from a first digital system to a second digital system comprising:

a memory circuit having a plurality of storage locations and having an input port and an output port;

a write pointer logic circuit coupled to said memory circuit, said write pointer logic circuit having a first write counter, and a second write counter, wherein said first write counter generates a write pointer value indicating the storage location of said memory circuit to which incoming data is written, and wherein said second write counter generates an empty flag reference value, said empty flag reference value being greater than or equal to said write pointer value;

a read pointer logic circuit coupled to said memory circuit, said read pointer logic circuit having a read counter, wherein said read counter generates a read pointer value indicating the storage location of said memory circuit from which outgoing data is read; and a flag logic circuit coupled to said write pointer logic circuit and to said read pointer logic circuit, wherein said flag logic circuit includes a comparator circuit for generating a comparator signal indicative of a predetermined relationship between said empty flag reference value and the read pointer value, wherein the comparator signal is associated with a first logical state when the FIFO buffer is filled with data and wherein the comparator signal makes a transition to a second logical state before the FIFO buffer becomes empty, and wherein said flag logic circuit further includes an empty flag output circuit coupled to an output line of said comparator circuit, said empty flag output circuit for selectively asserting an empty flag signal in response to a read signal when the comparator signal is in the second logical state.

2. A FIFO buffer as recited in claim 1 wherein said read pointer logic circuit receiving a read control signal, and wherein said empty flag output circuit includes a transfer gate coupled to the output line of said comparator circuit and including a control terminal for receiving a read control signal.

3. A FIFO buffer for sequentially transmitting data from a first digital system to a second digital system comprising:

a memory circuit having a plurality of storage locations and having an input port and an output port;

a write pointer logic circuit coupled to said memory circuit, said write pointer logic circuit having a first write counter and a second write counter, wherein said first write counter generates a write pointer value indicating the storage location of said memory circuit to which incoming data is written, and wherein said second write counter generates a write full flag reference value, said write full flag reference value being greater than said write pointer value;

a read pointer logic circuit coupled to said memory circuit, said read pointer logic circuit having a first read counter, and a second read counter wherein said first read counter generates a read pointer value indicating the storage location of said memory circuit from which outgoing data is read and wherein said second read counter generates a read full flag reference value, said read full flag value being less than or equal to said read pointer value; and a flag logic circuit coupled to said write pointer logic circuit and to said read pointer logic circuit, wherein said flag logic circuit includes a comparator circuit for generating a comparator signal indicative of a predetermined relationship between said write full flag reference value and said read full flag reference value, wherein the comparator signal is associated with a first logical state when the FIFO buffer is empty and wherein the comparator signal makes a transition to a second logical state before the FIFO buffer becomes full, and wherein said flag logic circuit further includes a full flag output circuit coupled to an output line of said comparator circuit, said full flag output circuit for selectively asserting a full flag signal in response to a write signal when the comparator signal is in the second logical state.

4. A FIFO buffer as recited in claim 3 wherein said write pointer logic circuit receiving a write control signal, and wherein said full flag output circuit includes a transfer gate coupled to the output line of said comparator circuit and including a control terminal for receiving a write control signal.

* * * * *